United States Patent [19]
Eno et al.

[11] Patent Number: 5,923,111
[45] Date of Patent: Jul. 13, 1999

[54] MODULAR PERMANENT-MAGNET ELECTRIC MOTOR

[75] Inventors: James Joseph Eno; Antonio Tinio Ganzon, both of Romulus, N.Y.

[73] Assignee: Goulds Pumps, Incoporated, Seneca Falls, N.Y.

[21] Appl. No.: 08/966,586

[22] Filed: Nov. 10, 1997

[51] Int. Cl.⁶ .................................................. H02K 15/02
[52] U.S. Cl. ...................... 310/156; 310/153; 310/154; 310/218
[58] Field of Search ................................. 310/156, 153, 310/154

[56] References Cited

U.S. PATENT DOCUMENTS

| | | | |
|---|---|---|---|
| 5,140,210 | 8/1992 | Shirakawa | 310/156 |
| 5,200,662 | 4/1993 | Tagami et al | 310/261 |
| 5,627,423 | 5/1997 | Marioni | 310/156 |
| 5,670,836 | 9/1997 | Horst | 310/156 |
| 5,731,012 | 3/1998 | Backus et al. | 425/151 |

Primary Examiner—Nestor Ramirez
Assistant Examiner—Thanh Lam
Attorney, Agent, or Firm—Brezina & Ehrlich

[57] ABSTRACT

A modular permanent-magnet electric motor assembly having a predetermined maximum power output for a submersible pump assembly, a stator having a plurality of electric coils adapted to be energized to create a magnetic field, and a rotor assembly disposed about a rotor shaft. The rotor assembly comprises a predetermined number of rotor modules sufficient to achieve the predetermined power output and a pair of bearing carriers separated by the rotor modules. Each rotor module comprises a rotor core and a plurality of magnets disposed about or otherwise associated with the rotor core. The magnetic field between the coils and the magnets causes rotation of the rotor modules, the rotor assembly, and, thus, the rotor shaft. The rotor assembly desirably also includes a protective sheath to prevent fluid from entering the rotor assembly and contacting the rotors. The predetermined number of rotor modules are installed on the shaft during the process of manufacturing the motor.

18 Claims, 3 Drawing Sheets

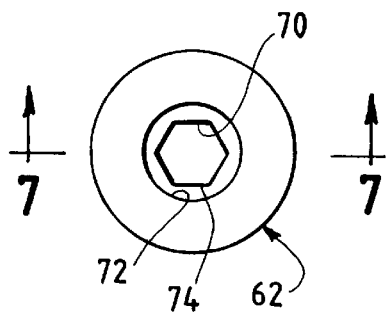
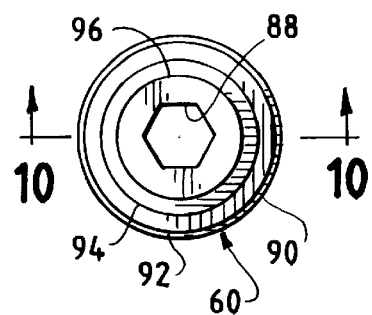
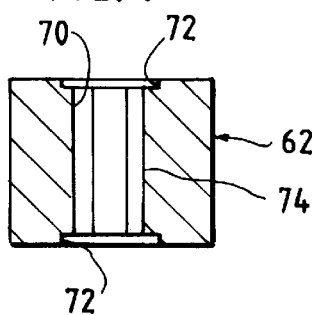
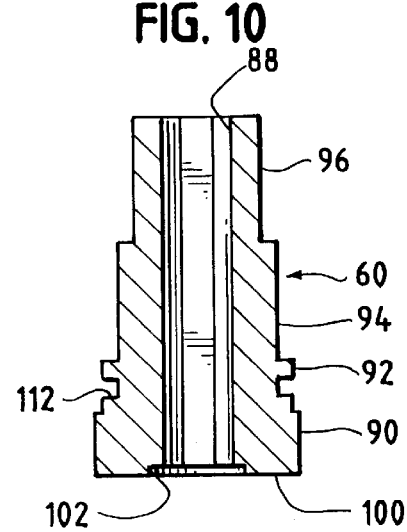
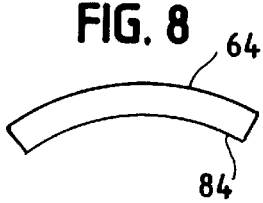
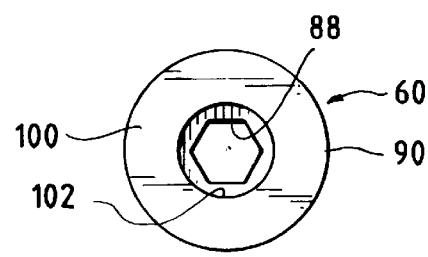
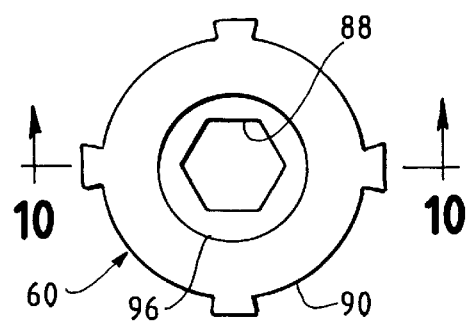

MODULAR PERMANENT-MAGNET ELECTRIC MOTOR

The present invention relates generally to a modular permanent-magnet electric motor, and, more particularly, to a modular permanent-magnet electric motor rotor and stator assembly for a submersible pump wherein the power output of the motor assembly can be selectively established by varying the number of rotor modules and correspondingly modifying the length of the stator stack.

BACKGROUND OF THE INVENTION

Submersible centrifugal pumps consist of a pump, and an electric motor suitable for operating submerged in water for driving the pump. Present designs use conventional induction type electric motors, which usually operate at two-pole speeds, i.e., 3,500 rpm. At speeds higher than 5,000 rpm, the efficiency of the more commonly used induction type motors begins to deteriorate.

The performance of a centrifugal pump is directly related to the running speed. The higher the running speed, the more pressure is developed, and a higher flow rate is generated. The pressure will increase by the square of the speed ratio while the flow rate will increase in direct proportion to the change in speed. Thus, if the running speed was changed from 3,500 to 10,000 rpm, the pressure developed would increase by a factor of 8.16, and the flow rate by 2.86. To meet the same requirements, the higher speed pump can be manufactured much smaller in physical size. This reduction in size translates to savings in material, and allows installation of the pump into smaller spaces.

At 10,000 rpm, the efficiency of an induction type motor becomes unacceptable. The alternative is an electric motor employing permanent-magnets, either in the rotor or stator, or both. This type of electric motor has excellent efficiency at high speeds, and does not incur as much induction losses as, for example, a squirrel cage induction motor. The magnetic flux is always preset, and does not have to be created by induction. For simplicity, the rotor almost always has the permanent-magnets, thus negating the need to commutate the electric power to the rotor. Usual prior art rotors are constructed as a solid piece, and then magnetized.

Rare-earth magnets have been developed, such as neodymium-ferrite-boron, which provide further efficiencies and size reduction. Such materials, however, are relatively expensive when incorporated into electric motors.

Prior art rotors are normally assembled as one solid piece, which is then magnetized. With rare-earth magnetic material, this construction is not economically feasible, or required.

The output power of a permanent-magnet electric motor is determined by the length of the stator and the corresponding rotor. For the same diameter of either rotor or stator, a larger axial length develops increased power, up to a reasonable limit. Therefore, if the rotor core consists of sections, or modules, the rotor length, and hence the output power, can be varied at the point of manufacture of the pump. Further, constructing the rotor core in modules allows the rotor to be produced using the powdered metal (sintered) process due to the relatively short length of each module. This produces significant cost reduction, as powdered metal technology lends itself to low cost, high volume production.

It is an object of the present invention to provide a modular permanent-magnet electric motor assembly, desirable for a submersible pump, wherein the power output of the motor can be variably selected at the manufacturing stage.

It is a further object of the present invention to provide a rotor for a permanent-magnet electric motor wherein the rotor is comprised of a plurality of modules, and the number of modules is determined by the desired power output of the motor. The length of the stator stack corresponds to the length of the rotor assembly.

A further object of the present invention is to provide a rotor utilizing thin sections of rare-earth magnets bonded to a rotor core to produce an efficient, less expensive and smaller size permanent-magnet electric motor.

Another object of the present invention is to provide a rare-earth magnet rotor assembly with reduced requirements of rare-earth materials while simultaneously allowing the flexibility to construct motors of varying power outputs.

SUMMARY OF THE INVENTION

The preferred embodiment of the present invention provides a modular permanent-magnet electric motor assembly having a varying number of magnetic modules in the rotor and adjusting the length of the stator stack to suit. In this manner, the power output of the motor can be selected at the point of manufacture, and the motor specifically constructed to provide the selected power output.

With the advent of rare-earth magnets, such as neodymium-ferrite-boron, further efficiencies in size and reduction are achieved. Such material, however, is expensive. Therefore, to reduce the required magnetic material mass, thin sections of materials are used, and these sections are bonded to steel, or iron, rotor cores. The present invention produces a reduction in the rare-earth material requirement while simultaneously allowing the construction of motors of varying power outputs.

Prior art has the rotor as one solid piece and then magnetized. With rare-earth material, it is not economically feasible, nor required, to construct the rotor as a single piece, and then magnetize the rotor. The rotor of the present invention is made from two materials: the core of low cost powder material (sintered) steel, or iron to provide the bulk, and the outer "skin" of rare-earth material configured as segments or rings.

To complete the rotor construction in a preferred embodiment, thin magnet segments, or rings are securely overlaid or bonded to the core sections. These segments are not magnetized until after they are bonded to the core sections. This technique makes handling easier and the segments are less prone to attracting magnetically-attracted debris. For bonding, a high strength adhesive, such as for example, Ciba-Geigy's Araldite 2014, a 2-part epoxy for high temperature applications, is used. At the projected motor operating speeds the centrifugal force acting on the magnet segments is very high and a reliable, high strength adhesive is required.

An alternate embodiment of the rotor core entails dovetail locks. These dovetail locks are incorporated into the sintered rotor core thus negating the full dependence on the adhesive to hold the magnets in place.

BRIEF DESCRIPTION OF DRAWINGS

The present invention and the advantages thereof will become more apparent upon consideration of the following detailed description when taken in conjunction with the accompanying drawings:

FIG. 6 is an end view of one of the rotor module cores of the rotor assembly of the modular permanent-magnet electric motor assembly manufactured in accordance with the embodiments illustrated in FIGS. 1–5;

FIG. 7 is a cross section view of a rotor module core assembly taken along the lines 7—7 of FIG. 6;

FIG. 8 is a plan view of the end of one of the magnets of the rotor modules of the modular permanent-magnet electric motor assembly;

FIG. 9 is an end view of one of the bearing carriers of the rotor assembly of the modular permanent-magnet electric motor assembly;

FIG. 10 is a cross sectional view taken along the lines 10—10 of FIG. 9;

FIG. 11 is a plan view of the opposite end of the bearing carrier illustrated in FIGS. 9–10; and FIG. 12 is an end view of an alternate embodiment of one of the bearing carriers of the rotor assembly of the modular permanent-magnet electric motor assembly illustrated in FIG. 9.

DETAILED DESCRIPTION OF THE PREFERRED EMBODIMENTS

Figure 1:
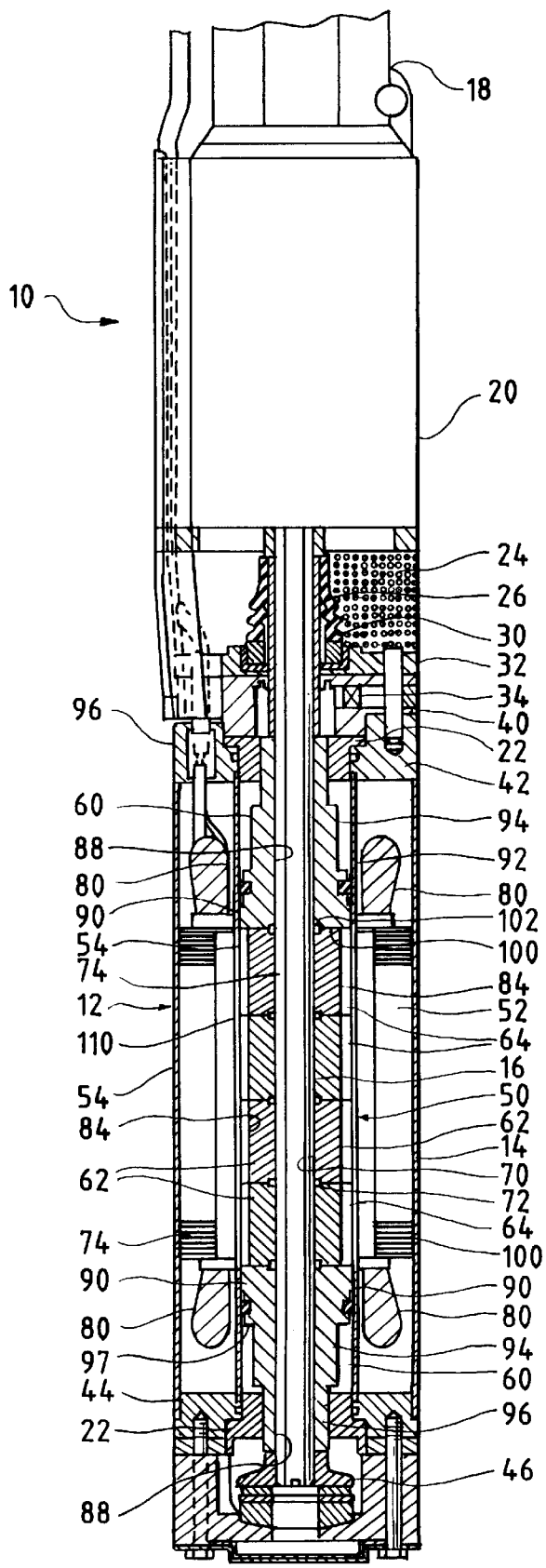
FIG. 1 is a partial cross sectional view of a submersible pump assembly, taken along its longitudinal axis, having a modular permanent-magnet electric motor assembly constructed in accordance with a preferred embodiment of the invention.
Figure 2:
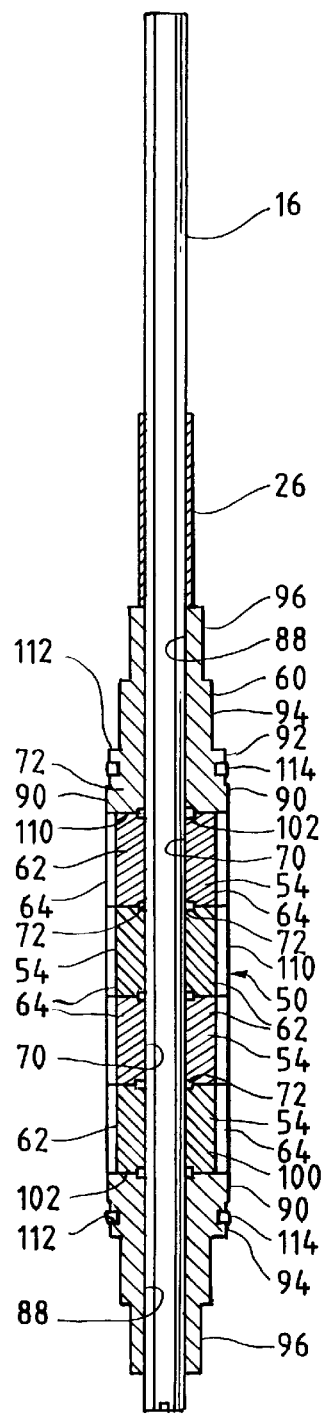
FIG. 2 is a cross sectional view, taken along the longitudinal axis, of the rotor assembly of the modular permanent-magnet electric motor assembly and the rotor shaft of the submersible pump assembly of FIG. 1.
Figure 3:
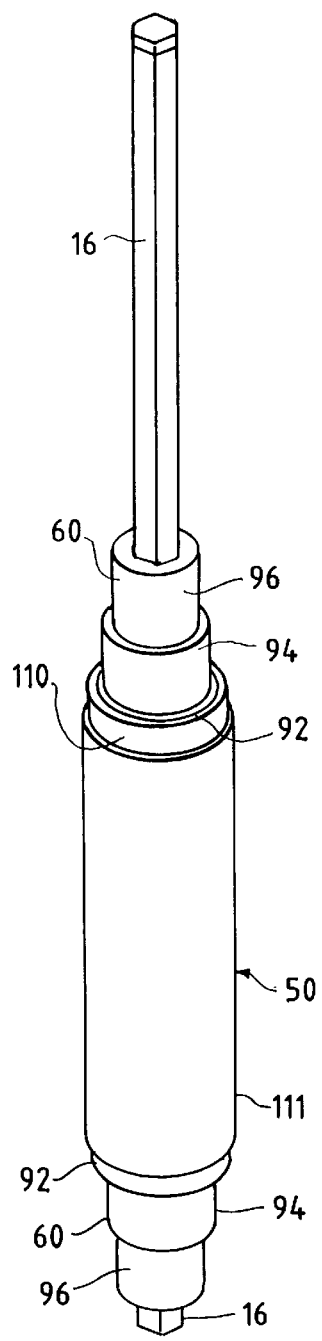
FIG. 3 is an outer perspective view of an embodiment of the rotor and shaft assembly, illustrated in FIGS. 1–2.
Figure 4:
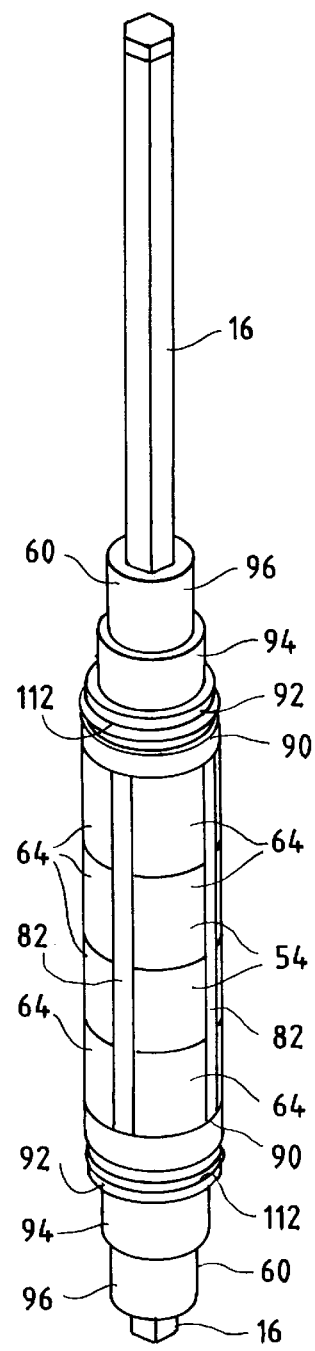
FIG. 4 is a perspective view of the rotor and shaft assembly of FIGS. 1 and 2, with the cylindrical covers of the rotor assembly removed to illustrate the individual rotor modules of the rotor assembly.
Figure 5:
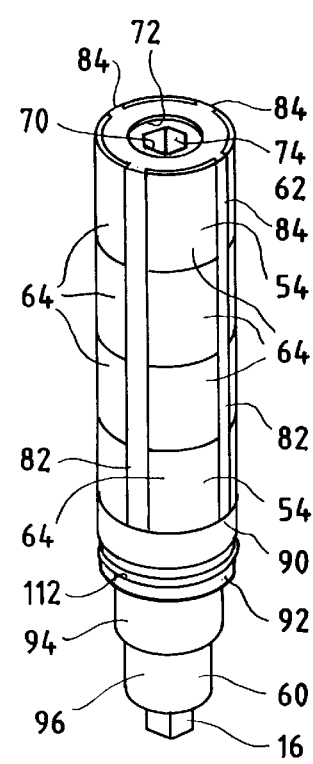
FIG. 5 is a perspective view of the rotor and shaft assembly of FIGS. 1 and 2, with one of the bearing carriers and a portion of the rotor shaft removed to illustrate, in perspective, an end of one of the rotor modules of the rotor assembly.

A submersible pump assembly 10 having a modular permanent-magnet electric motor assembly 12 constructed in accordance with a preferred embodiment of the present invention is illustrated in FIG. 1. The modular permanent-magnet electric motor assembly 12, which is contained within housing 14 of the motor and pump assembly 10, also includes power developing and pumping components such as, for example, rotor shaft 16, discharge head 18, casing 20, a pair of radial bearings 22, suction strainer 24, rotor shaft sleeve 26, sand slingers 30, motor adaptor 32, check valve 34, filter 40, end flange 42, end bell 44 and thrust bearing assembly 46.

The modular permanent-magnet electric motor assembly 12 produced in accordance with preferred embodiment of the present invention comprises a rotor assembly 50 and a stator 52. The rotor assembly 50 includes a plurality of rotor modules 54 disposed about the rotor shaft 16 in end-to-end axial alignment, and a pair of end units in the form of bearing carriers 60. The bearing carriers 60 are disposed about the rotor shaft 16, and are separated from each other by the plurality of rotor modules 54. The number of rotor modules 54 disposed about the rotor shaft 16 depends upon the desired power output of the modular permanent-magnet electric motor assembly 12.

Each rotor module 54 comprises a core 62 and a plurality of magnets 64 disposed about and attached to the module core. In the illustrated embodiment, each module core 62 is generally cylindrical and defines an internal channel 70 that extends through the module core for receiving the rotor shaft 16. Countersunk bores 72, contiguous with the channel 70, may be defined at each end of the rotor core 62 to facilitate placement of the rotor core onto the rotor shaft 16 and to receive excess adhesive. Desirably, the bores 72 are wider than the channel 70. In the illustrated embodiment, for example, the rotor shaft 16 and the channels 70 have generally hexagonal cross sections.

During manufacture, each rotor core 62 is suitably bonded to the rotor shaft 16. Any suitable adhesive may be used, such as, for example, an anaerobic adhesive preferably having an accelerator. In accordance with a preferred embodiment of the invention, an adhesive sold under the brand name LOCTITE 325 or equivalent may be used. The adhesive is applied to the inner walls 74 of the rotor cores 62 or to the rotor shaft 16. The bearing carriers 60 are disposed about and support the rotor shaft 16.

An alternate embodiment of the rotor core 62 comprises dovetail locks 114. These dovetail locks 114 are incorporated into the rotor core 62 thus negating the full dependence on the adhesive to hold the magnets in place.

The stator 52 extends at least the length of the plurality of rotor modules 54, and includes a plurality of electric coils 80 extending along the length of the stator. The electric coils 80 are adapted to be energized to create a magnetic field and, together with the magnets 64, cause rotation of the rotor modules 54 and shaft 16. The number of electric coils 80 associated with the stator 52 depends upon the desired number of poles. The modular permanent-magnet electric motor assembly 12 illustrated in the embodiments of the invention of FIGS. 1–11, for example, comprises four poles and thus the stator 52 includes four electric coils 80, two of which are adapted to create north poles and two of which are adapted to create south poles. With this embodiment, the north poles are positioned diametrically opposite each other (relative to the rotor modules 54), and the south poles are positioned diametrically opposite each other (relative to the rotor modules 54).

The magnets 64 may have any configuration suitable to facilitate rotation of the rotor modules 54 during energization or de-energization of the electric coils 80. Each of the illustrated magnets 64, for example, is generally arcuate and has an arcuate length dependent on design. For example, for a four-pole motor design, the magnets 64 have an arcuate length in the range of about 70° to 75°, and, desirably, of about 72°. The illustrated magnets 64 are equally spaced, and the rotor modules 54 may further include non-magnetic spacers 82 separating adjacent magnets from each other. Desirably, the spacers 82 extend substantially along the length of the plurality of rotor modules 54.

The magnets 64 may be bonded to the respective module cores 62 in any suitable manner. If desired, the bottom surfaces 84 (FIG. 8) of the magnets 64 may be bonded to the module core 62 by any suitable adhesive, such as, for example, a 2-part adhesive. In accordance with a preferred embodiment of the invention, the adhesive sold under the brand name ARALDITE 2014 or the adhesive sold under the name ARALDITE 2015 is used.

Each bearing carrier 60 defines a channel 88 (FIGS. 1, 10) for receiving the rotor shaft 16, and desirably comprises first, second, third and fourth generally cylindrical sections 90, 92, 94 and 96, each, as illustrated in FIG. 10, having different outer diameters. Preferably, the outer diameter of the first section 90 of each bearing carrier 60 is substantially the same as the outer diameter of the rotor modules 54, and a front face 100 of the first section 90 defines a bore 102 having dimensions substantially similar to the bores 72 defined by the module cores 62. The outer diameter of the second section 92 preferably is slightly less than the outer diameter of the first section 90. The fourth section 96 of each bearing carrier 60 is disposed within a respective radial bearing 22 of the submersible pump assembly 10. The bearing carriers 60 are desirably constructed of a non-electrical conductive material so that the bearing carriers can act as insulators against eddy currents, which promotes higher motor efficiency.

The rotor assembly 50, constructed in accordance with a preferred embodiment of the invention includes a protective sheath 110 (FIG. 1) adapted to maintain the rotor modules 54 in a sealed, fluid-tight condition. The protective sheath 110 may be in the form of a cylindrical cover that substantially encases the rotor modules 54. The length of the cylindrical cover 110 depends upon the number of rotor modules 54 disposed on the rotor shaft 16.

An annular groove 112 (FIGS. 2, 4, 5) is defined in the second section 92 of each bearing carrier 60 for receiving an O-ring seal 114. The O-ring seals 114 (FIG. 2) are disposed between the cylindrical cover 110 and the second sections 92 of respective bearing carriers 60 and are adapted to further facilitate sealing of the rotor modules 54.

Energization of the electric coils 80 of the stator 52 causes rotation of the rotor modules 54, which, in turn, causes rotation of the rotor shaft 16. This results from the magnetic field created between the electric coils 80 and the magnets 64. When like poles of the electric coils 80 and magnets 64 are aligned, a repulsive force exists between the respective coils and magnets, causing the respective magnets to move away from the respective coils; and, when opposite poles of the electric coils and magnets are aligned, an attraction force exists between the respective electric coils and magnets causing the respective magnets to move towards the respective electrical coils, as is well known in the art. A continuous rotation of the rotor modules 54 can be achieved when the electric coils 80 are alternately and rapidly energized and de-energized.

The present invention also provides a method for manufacturing the modular permanent-magnet electric motor assembly 12 to produce a predetermined power output by adding to the rotor shaft 16 a plurality of additional rotor modules 54 during manufacture of the modular permanent-magnet electric motor assembly. If desired, the maximum power output of the modular permanent-magnet electric motor assembly 12 can likewise be decreased by installing fewer rotor modules 54 on the rotor shaft 16.

Accordingly, the present invention provides a modular permanent-magnet electric motor assembly 12 having a maximum power output that can be modified during manufacture by installing a variable, predetermined number of rotor modules 54 to the rotor shaft 16. Since the individual rotor modules 54 normally have the same diameter, the diameter of the modular permanent-magnet electric motor assembly 12 or the submersible pump assembly 10 is not changed when the power output is selected during the manufacturing process. Also, since the rotor assembly 50 of the modular permanent-magnet electric motor assembly is also fluid-tight, the modular permanent-magnet electric motor assembly 12 is particularly well suited for use with submersible pump assemblies.

The foregoing description is for purposes of illustration only and is not intended to limit the scope of protection accorded this invention. The scope of protection is to be measured by the following claims, which should be interpreted as broadly as the inventive contribution permits.

We claim:

1. A modular permanent-magnet electric motor assembly producing a predetermined maximum power output, for a submersible pump assembly having a shaft adapted to be rotatably driven by the motor assembly, the motor assembly comprising:

a stator having a plurality of coils adapted to be energized to create a magnetic field;

a predetermined number of rotor modules sufficient to achieve the predetermined maximum power output for the motor assembly, each rotor module comprising a module core disposed about the shaft and a plurality of magnets associated with the module core; and a pair of bearing carriers disposed about the shaft and separated by the rotor modules.

2. The modular permanent-magnet electric motor assembly of claim 1 wherein the rotor modules are mounted to the rotor in end-to-end alignment.

3. The modular permanent-magnet electric motor assembly of claim 2 wherein each bearing carrier is comprised of a non-electrical conductive material.

4. The modular permanent-magnet electric motor assembly of claim 2 wherein each module core has two ends and defines a channel adapted to receive the shaft and a bore at each end, the channel and bores being contiguous.

5. The modular permanent-magnet electric motor assembly of claim 4 wherein the channel and bores have generally hexagonal cross sections.

6. The modular permanent-magnet electric motor assembly of claim 4 wherein each module core is adapted to be bonded to the shaft of the submersible pump assembly by an adhesive.

7. The modular permanent-magnet electric motor assembly of claim 1 wherein the rotor assembly further includes a cylindrical cover adapted to be disposed substantially about the rotor modules on the shaft.

8. The modular permanent-magnet electric motor assembly of claim 7 wherein the cylindrical cover is also disposed about at least a portion of each bearing carrier.

9. The modular permanent-magnet electric motor assembly of claim 8 further including a pair of seals disposed about the shaft, each seal disposed between the cylindrical cover and a respective bearing carrier.

10. The modular permanent-magnet electric motor assembly of claim 1 wherein each magnet has a bottom surface engaged with a corresponding rotor core.

11. The modular permanent-magnet electric motor assembly of claim 10 wherein each magnet has a generally arcuate construction.

12. The modular permanent-magnet electric motor assembly of claim 10 wherein the bottom surface of each magnet is bonded to the corresponding module core by an adhesive.

13. The modular permanent-magnet electric motor assembly of claim 10 comprising a plurality of arcuate magnets disposed about each respective module core.

14. The modular permanent-magnet electric motor assembly of claim 13 wherein the magnets disposed about each respective module core are substantially equally spaced apart from each other, and each magnet has an arcuate length dependent on the design.

15. The modular permanent-magnet electric motor assembly of claim 13 wherein four generally arcuate magnets disposed about each respective module core are substantially equally spaced apart from each other, and each magnet has an arcuate length in the range of about 70° to 75°.

16. The modular permanent-magnet electric motor assembly of claim 13 further comprising a plurality of spacers extending substantially along the length of the rotor modules on the shaft, the four generally arcuate magnets disposed about each respective module core being separated from each other by the spacers.

17. The modular permanent-magnet electric motor assembly of claim 10 wherein the rotor core comprises dovetail locks.

18. A method of manufacturing a modular permanent-magnet electric motor assembly to achieve a predetermined maximum power output for a submersible pump assembly having a rotor shaft adapted to be rotatably driven by the modular permanent-magnet electric motor assembly and to receive a plurality of rotor modules to establish the power output of the modular permanent-magnet electric motor assembly, the motor assembly including a stator having a plurality of electric coils adapted to create a magnetic field, the method comprising the step of:

adding a predetermined number of rotor modules to the shaft sufficient to achieve the predetermined maximum power output, each rotor module comprising a module core adapted to be disposed about the rotor shaft and a plurality of magnets.

* * * * *